Aug. 10, 1926.
A. PRESS
1,595,730
BALANCED REGENERATIVE DETECTOR
Original Filed June 17, 1920
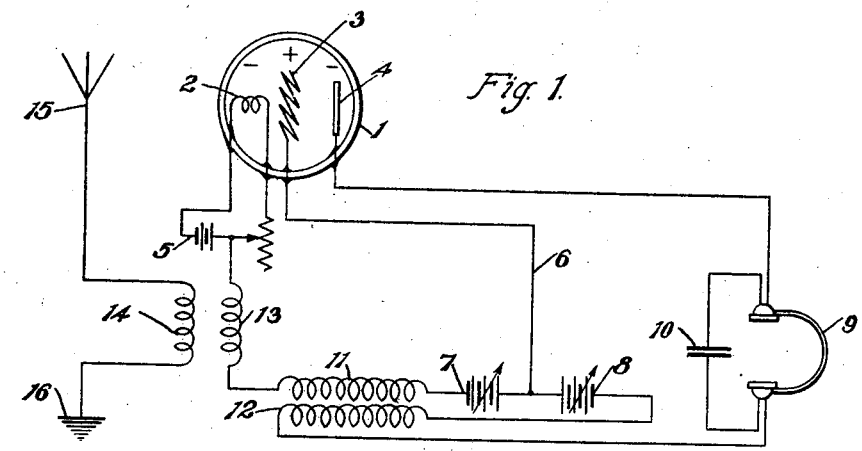
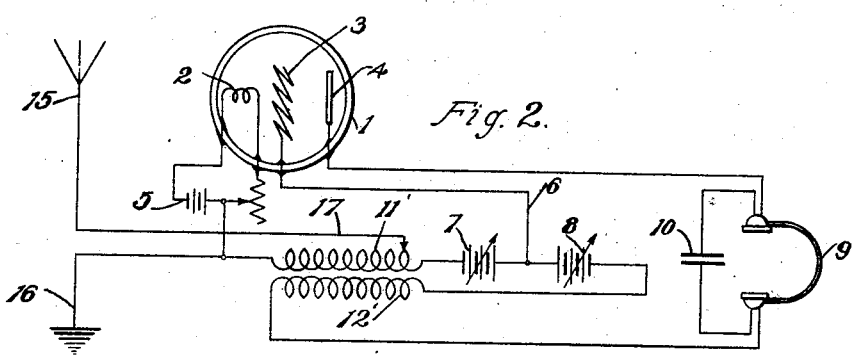
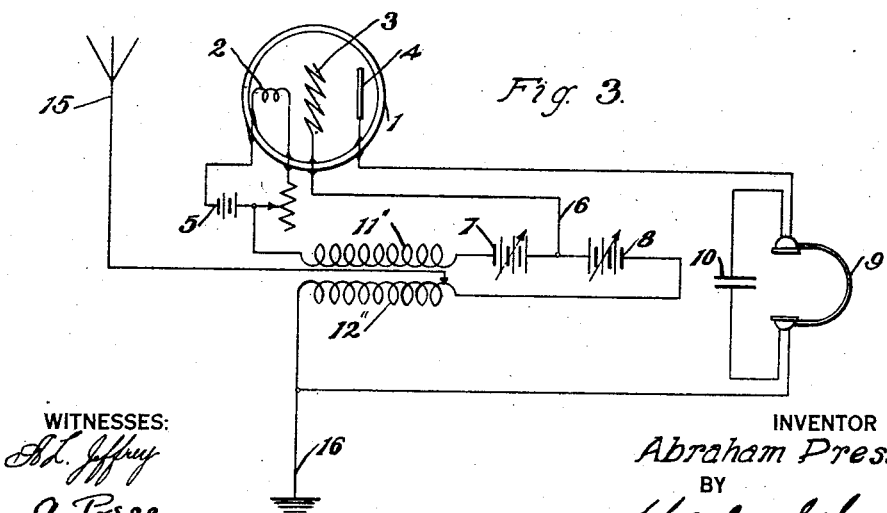
WITNESSES:
INVENTOR
Abraham Press
BY
ATTORNEY Patented Aug. 10, 1926.

1,595,730

UNITED STATES PATENT OFFICE.

ABRAHAM PRESS, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCED REGENERATIVE DETECTOR.

Application filed June 17, 1920, Serial No. 389,540. Renewed January 7, 1926.

My invention relates to three-electrode valves and more especially to those in which the grid electrode is more positive than the remaining two electrodes.

One object of my invention is to provide, not only a three-electrode system of circuits which shall be more sensitive to electro-magnetic disturbances than has heretofore been possible, but, by means of a regenerative coupling, to further increase such improved sensitivity.

A still further object is to provide a system of circuits that shall be simple in application, require very little adjustment, and, furthermore, require a minimum number of parts.

Figure 1 is a diagrammatic view of my regenerative receiver circuit; Figs. 2 and 3 are similar views of simplified modifications.

In Fig. 1, I have shown a valve 1 with three electrodes comprising a filament 2, a grid 3 and a plate 4. The filament 2 is excited by means of an adjustable battery 5, in a manner well known to the art. However, the grid 3 is connected to the filament 2 by means of a lead 6, forming the junction between two adjustable opposing batteries 7 and 8, the one of which is connected between the filament 2 and the grid 3, and the other, 8 is connected between the grid lead 6 and the plate 4.

In the arrangement of the two batteries 7 and 8, with respect to the grid 3, I provide the positive pole of the battery which shall, in each case, be connected to the grid. Again, in the grid-plate circuit, I provide a detecting device, such as a telephone receiver 9, shunted, preferably, by means of a suitable capacity 10.

In order to provide the regenerative feature, I insert a coupling-coil member 11 in the filament-grid circuit and an associated coupling member 12 in the grid-plate circuit. Moreover, in Fig. 1, I have also indicated an antenna-coupling member 13 in series with the coupling member 11 of the filament-grid circuit, which former coupling member is associated with an antenna-coupling member 14 in series with the antenna 15 and the ground wire 16.

In Figs. 2 and 3, I have indicated a means whereby the antenna coupling may be merged with the regenerative coupling. Thus, in the case of Fig. 2, the coupling member 11' is connected to the antenna 15 by means of an adjustable lead 17, whereas the opposite end of the coil 11 is connected to ground by means of the ground wire 16. In this case, therefore, the associated coupling member 12' acts as the seondary to the antenna. In Fig. 3, the antenna 15 is adjustably connected to the coupling member 12'' at one end, whereas the opposite end of the coil 12'' is connected to earth by means of the ground wire 16. In this case, the coupling member 11'' in the grid-filament circuit corresponds to the antenna secondary.

In the operation of my device, I adjust the two batteries 7 and 8 to such degree that no current flows in the plate circuits 4, 8, 3, although, under these circumstances, a current will flow in the grid-filament circuit. Under these circumstances, when balance has been substantially obtained, an incoming wave, acting upon the coupling-coil members between the grid-filament and grid-plate, will serve to destroy such balance and thereby cause a considerable amount of flow to take place through the telephones. Thus, referring to Fig. 1 in particular, the incoming wave, acting by means of the antenna-coupling coil 13—14, disturbs the balance between the two opposing circuits 3—11—2 and 3—8—4, causing a current to flow in the telephone or plate circuit, as indicated. Such current flow, acting inductively by means of the coil member 12 upon the coupling-coil member 11 in the grid-filament circuit, magnifies the difference produced between the two circuits, thereby causing an additional out-of-balance current to pass through the telephone.

Having disclosed the nature of my invention, what I claim is:

1. In combination, a vacuum-tube device having three electrodes, means for maintaining two of said electrodes at a common potential and for giving to the third electrode a potential positive relative to the common potential of said two electrodes, said means including equal and opposed sources of electromotive force and a regenerative coupling.

2. In a radio receiving system, a vacuum-tube device having three electrodes, means for maintaining two of said electrodes at a common potential and for giving to the third electrode a potential positive relative to the common potential of said two electrodes, a device for impressing on said means a varying potential difference corresponding to the signal, said means including equal and opposed sources of electromotive force and an electromagnetic regenerative coupling for increasing the changes of the potential of said third electrode relative to the other two electrodes, and a detecting device in one branch of said coupling.

3. In a radio-signal-receiving system, a vacuum-tube device having three electrodes, means for maintaining two of said electrodes at a common potential and for giving to the third electrode a potential positive relative to the common potential of said two electrodes, an antenna, said means including equal and opposite sources of electro-motive force and an electromagnetic regenerative coupling, one branch of said coupling being electrically associated with said antenna.

In testimony whereof, I have hereunto subscribed my name this 12th day of June, 1920.

ABRAHAM PRESS.